(12) United States Patent
Bannister et al.

(10) Patent No.: US 6,235,073 B1
(45) Date of Patent: May 22, 2001

(54) FASTENER RETENTION SYSTEM

(75) Inventors: Robert A. Bannister; Mark V. Holzmann; Michael J. Connor, all of Stoughton, WI (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

(21) Appl. No.: 09/438,008

(22) Filed: Nov. 10, 1999

(51) Int. Cl.[7] ............................ B01D 50/00; F16B 39/00
(52) U.S. Cl. ................................. 55/385.3; 411/166
(58) Field of Search .................... 55/385.3, 498, 55/522, 323; 411/166, 372, 533, 107, 396, 182, 338, 339, 901, 902, 903, 377, 373, 372.6, 372.5

(56) References Cited

U.S. PATENT DOCUMENTS

| | | | |
|---|---|---|---|
| 2,698,670 | * | 1/1955 | Sebok ................................. 55/385.3 |
| 2,934,165 | * | 4/1960 | Dudinec ............................. 55/385.3 |
| 3,293,830 | * | 12/1966 | McKinlay ........................... 55/385.3 |
| 3,461,545 | | 8/1969 | Bush . |
| 4,347,026 | | 8/1982 | Schelhas et al. . |
| 4,482,368 | | 11/1984 | Roberts . |
| 4,589,809 | | 5/1986 | Moore et al. . |
| 4,681,497 | | 7/1987 | Berecz . |
| 4,750,878 | * | 6/1988 | Nix et al. ............................. 411/509 |
| 4,756,654 | | 7/1988 | Clough . |
| 4,828,440 | * | 5/1989 | Anderson et al. .................... 411/104 |
| 4,850,778 | * | 7/1989 | Clough et al. ....................... 411/182 |
| 5,067,750 | | 11/1991 | Minneman . |
| 5,098,242 | | 3/1992 | Schaty . |
| 5,100,443 | * | 3/1992 | Berto ................................. 55/385.3 |
| 5,106,250 | * | 4/1992 | Fischer et al. ...................... 411/107 |
| 5,368,621 | * | 11/1994 | Pool ................................. 55/385.3 |
| 5,395,194 | | 3/1995 | Johnson et al. . |
| 5,523,142 | | 6/1996 | Bedoussac . |
| 5,542,158 | | 8/1996 | Gronau et al. . |
| 5,749,670 | | 5/1998 | Astor . |
| 5,758,987 | | 6/1998 | Frame et al. . |
| 5,782,575 | | 7/1998 | Vincent et al. . |
| 5,807,052 | | 9/1998 | Van Boven et al. . |
| 5,813,809 | | 9/1998 | Russum . |
| 5,823,727 | * | 10/1998 | Lee .................................... 411/107 |
| 5,839,847 | | 11/1998 | Patel . |
| 5,885,042 | | 3/1999 | Jonatzke . |
| 5,941,669 | * | 8/1999 | Aukzemas ........................... 411/107 |

FOREIGN PATENT DOCUMENTS

| | | |
|---|---|---|
| 0882483 | 12/1998 | (EP) . |
| WO97/16235 | 5/1997 | (WO) . |

* cited by examiner

Primary Examiner—S. Thomas Hughes
Assistant Examiner—Marc Jimenez
(74) Attorney, Agent, or Firm—Andrus, Sceales, Starke & Sawall, LLP

(57) ABSTRACT

A fastener retention system, including for a filter housing, applies an axial retention force in a plastic molded structure having a bore in a standing tower extending along an axis. A fastener extends axially in the bore and has a first axial end retained in the bore in snap fit relation, and a second distally opposite axial end extending axially beyond the bore for mating with a retaining member holding a cover on a base in a filter application in assembled condition. The fastener is secured to the tower in permanent snap fit relation. The fastener is axially slid into the bore before crystallization and hardening of the plastic. The fastener is axially trapped in the bore between spaced facing abutments, and is anti-rotationally keyed thereto.

8 Claims, 3 Drawing Sheets

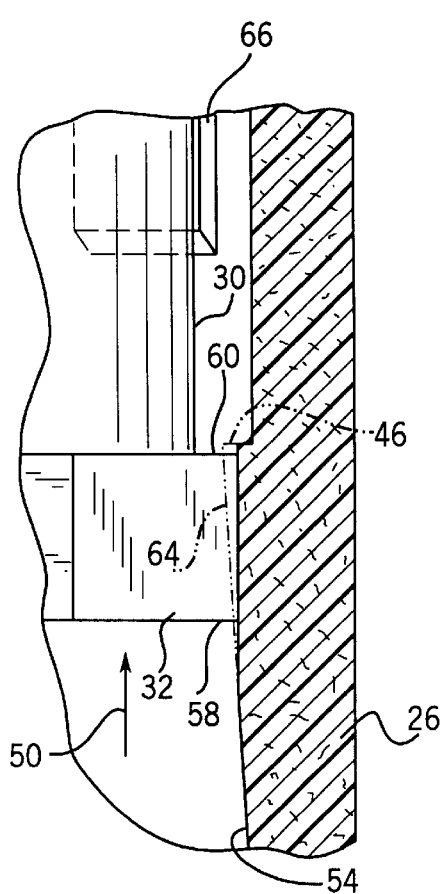
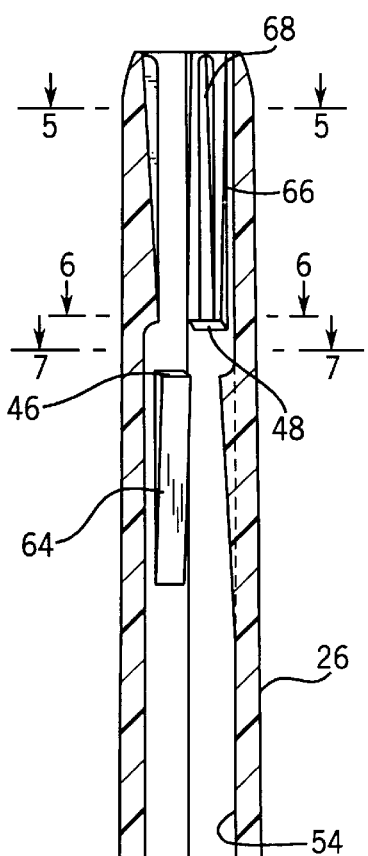
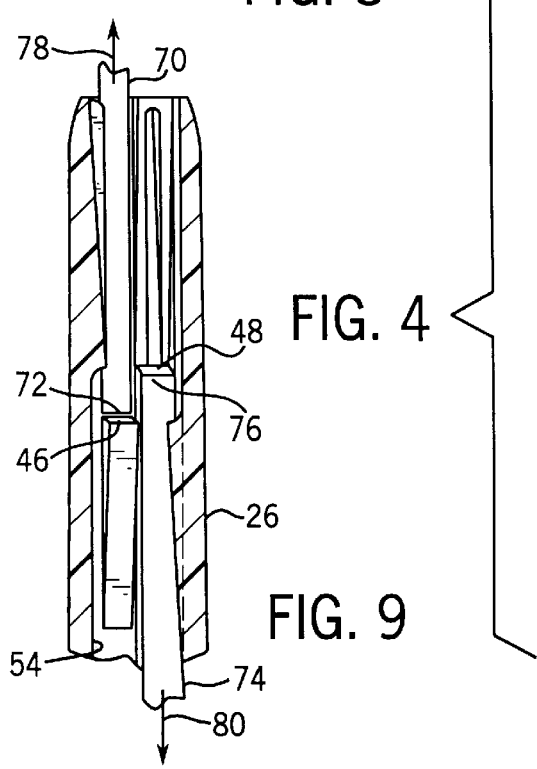
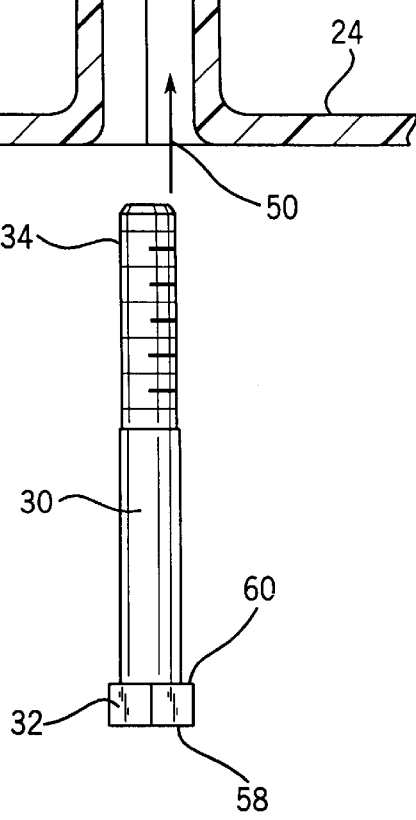
FIG. 8
FIG. 4
FIG. 9

FASTENER RETENTION SYSTEM

BACKGROUND AND SUMMARY OF THE INVENTION

The invention relates to a fastener retention system for applying an axial retention force in a plastic molded structure, including axially clamping a filter element in a filter housing, and to methods for making same.

It is known in the prior art to insert fasteners in plastic in various ways, including molding the fastener directly into the plastic, welding the fastener into bosses, e.g. by sonic welding or the like, clipping the fastener over molded-in features, snap-in past flexible tabs, etc.

The present invention provides a system and method for retaining fasteners in plastic, and does not require the use of extra parts or complex assembly procedures. The invention allows both low cost standard fasteners and custom fasteners to be assembled into plastic without requiring the use of robots, expensive custom tools, welders, or additional parts. The present invention provides a sturdy, inexpensive part, with minimized content and manufacturing cost.

The invention is particularly useful for a fastener applying an axial compression force holding a filter element between a cover and a base of a filter housing. In the latter application, the invention retains the high durability for pull-out, push-out, and torque-out, that inserted fasteners must maintain to prevent filter failure.

BRIEF DESCRIPTION OF THE DRAWINGS

FIG. 4 is a pre-assembly exploded view of the structure of FIG. 3.

FIG. 8 is an enlarged view of a portion of the structure of FIG. 3 during assembly.

FIG. 9 is a view of a portion of the structure of FIG. 4 schematically illustrating mold surface withdrawal.

DETAILED DESCRIPTION OF THE INVENTION

Figure 1:
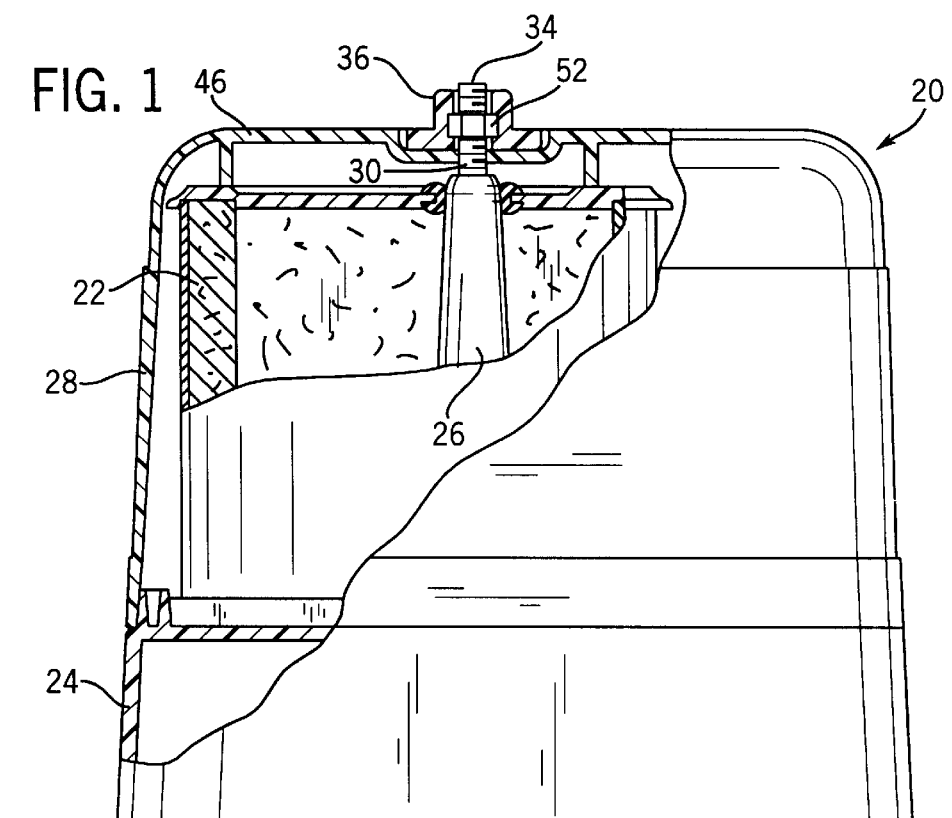
FIG. 1 is a side elevation view partially cut away of a filter housing incorporating a fastener system in accordance with the invention.
Figure 2:
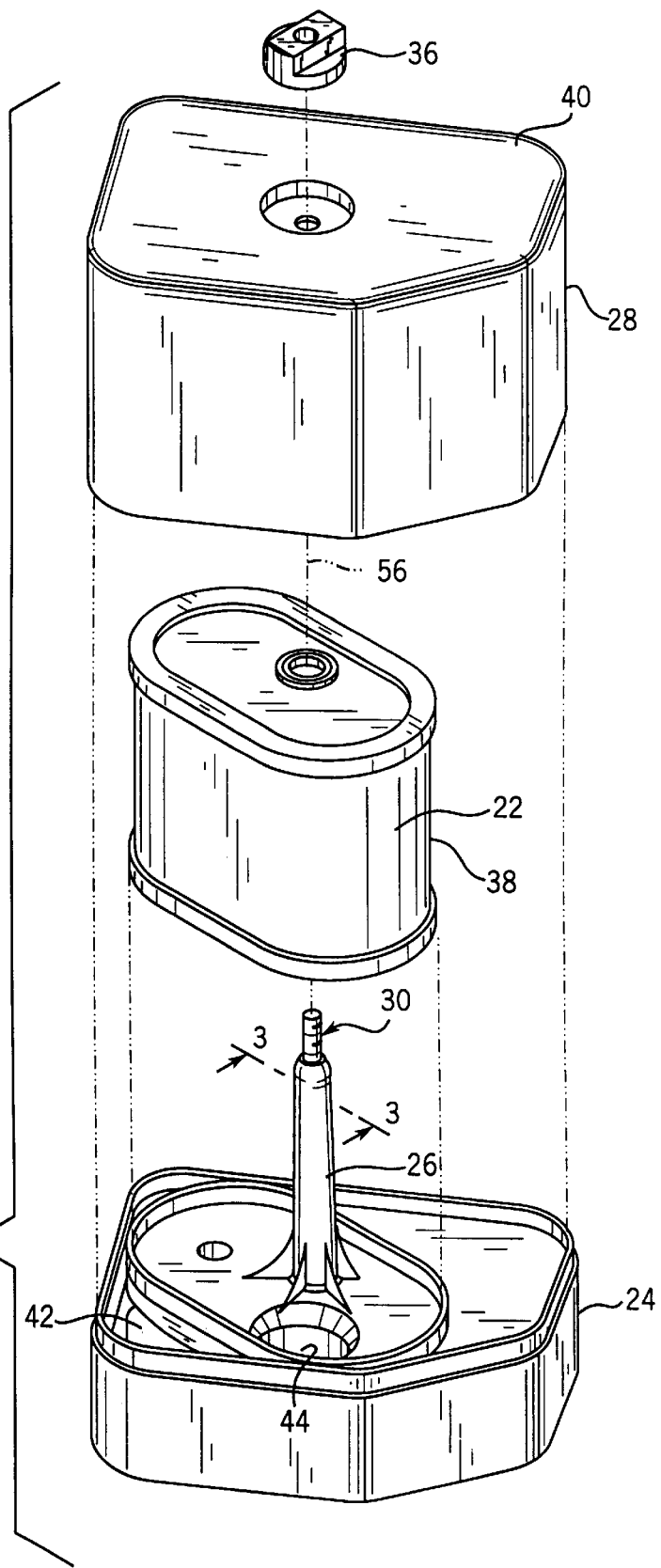
FIG. 2 is an exploded perspective view of the assembly of FIG. 1.

FIGS. 1 and 2 show a filter housing 20 for a filter element 22. The filter housing includes a base 24 having an axially extending standing tower 26, and a cover 28 mounted to the base by a fastener 30 applying an axially compression force holding filter element 22 between cover 28 and base 24. The fastener has a first axial end 32, FIGS. 3 and 4, secured to tower 26 in snap fit relation, to be described, and a second distally opposite axial end 34 releasably securing cover 28 to base 24 at retaining member 36, FIGS. 1 and 2.

The filter element and filter housing are known in the prior art, including various fastening systems for applying the noted axial compression force. Filter element 22 has a perimeter sidewall 38, FIG. 2, surrounding a hollow interior. Tower 26 extends axially upwardly or forwardly within the hollow interior and is surrounded by sidewall 38. Sidewall 38 extends axially between base 24 and top wall 40 of cover 28 and is axially held therebetween by the axial compression force applied by the fastener. FIGS. 1 and 2 show an air filter, with air flowing into the housing at air inlet 42 and then flowing radially inwardly through the perimeter sidewall 38 of filter element 22 into the hollow interior thereof and then exiting at air outlet 44, all as is known. The present invention is directed to an improved fastener retention system.

Figure 3:
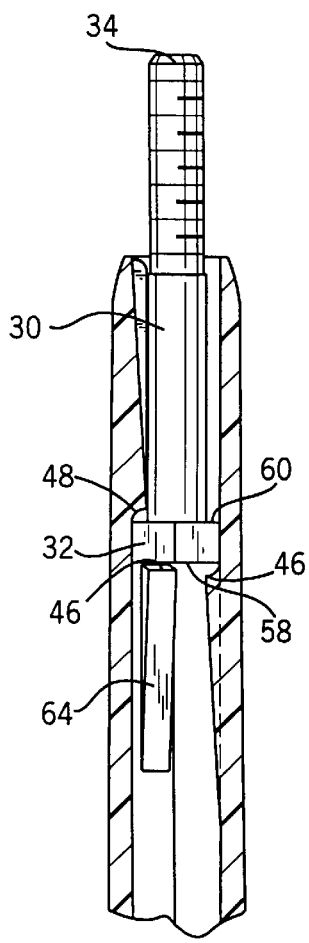
FIG. 3 is a sectional view taken along line 3—3 of FIG. 2.

Tower 26 is provided with first and second axially spaced snap fit abutments 46 and 48, FIGS. 3 and 4. Axial end 32 of fastener 30 is axially slidable forwardly, as shown at arrow 50, FIGS. 8 and 4, past abutment 46, to be described, in snap fit relation, FIG. 3, and into engagement with abutment 48, and is axially trapped between abutments 46 and 48 in permanent snap fit relation. Retaining member 36 is releasably attachable to axial end 34 of fastener 30 and engages cover 28 at top wall 40 to hold cover 28 and base 24 in axially assembled condition. In preferred form, fastener 30 is a bolt having a bolt head providing the noted first axial end 32, and having a distally opposite threaded end providing the noted second axial end 34. Bolt head 32 is permanently axially trapped between first and second axially spaced abutments 46 and 48 in snap fit relation. Retaining member 36 is a plastic cap molded around hex nut 52 which is internally threaded complementally to threaded end 34 of the bolt, and engages the latter in threaded relation and is tightenable thereon to apply the noted axial compression force.

Base 24 and cover 28 of the filter housing are plastic molded structures. Molded plastic base 24 has a bore 54, FIG. 4, extending axially through tower 26 along axis 56, FIG. 2. Fastener 30 extends axially in bore 54 and has the noted first axial end 32 retained in bore 54 in the noted snap fit relation, and the noted second distally opposite end 34 extending axially forwardly and upwardly beyond bore 54. Axial end 32 of the fastener at the noted bolt head has distally opposite axially facing first and second shoulders 58 and 60. Shoulder 58 faces axially rearwardly. Shoulder 60 faces axially forwardly. Bore 54 has the noted axially spaced distally oppositely facing first and second abutments 46 and 48. Abutment 46 faces axially forwardly. Abutment 48 faces axially rearwardly. Shoulder 58 axially faces abutment 46, FIG. 3. Shoulder 60 axially faces abutment 48. Axial end 32 of the fastener has a perimeter complementally shaped to bore 54 and is received in the bore in keyed relation to prevent rotation of fastener 30 about axis 56. In the disclosed embodiment, the perimeter of bolt head 32 is hex shaped, as is the perimeter of bore 54. The axial spacing of abutments 46 and 48 is substantially equal to the axially spacing of shoulders 58 and 60, to substantially prevent axial movement of fastener 30 in bore 54.

Figure 6:
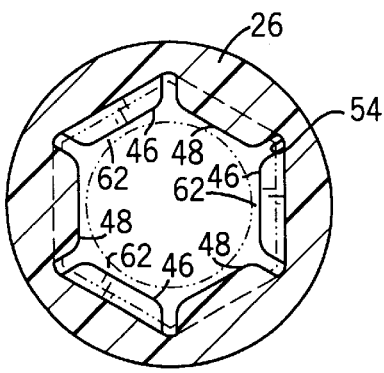
FIG. 6 is a sectional view taken along line 6—6 of FIG. 4.
Figure 5:
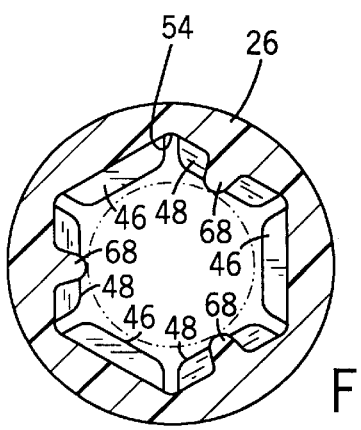
FIG. 5 is a sectional view taken along line 5—5 of FIG. 4.
Figure 7:
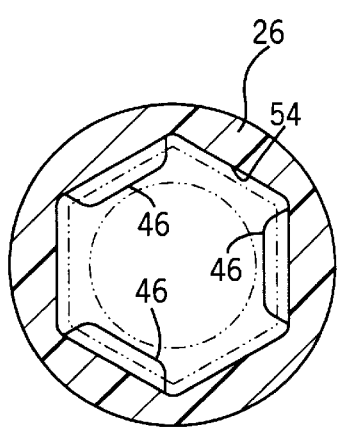
FIG. 7 is a sectional view taken along line 7—7 of FIG. 4.

In preferred form, a plurality of first abutments 46, FIG. 7, are circumferentially spaced around bore 54, and a plurality of second abutments 48, FIG. 6, are circumferentially spaced around bore 54. Abutments 46 are interdigitated relative to abutments 48 in axial end view, FIG. 6. Each of first abutments 46 is axially nonaligned with a respective second abutment 48 and instead is axially aligned with and axially spaced from a respective circumferential gap 62 between respective second abutments 48 in interdigitated manner. In preferred form, three of the noted first abutments 46 are provided, and are triangulated about bore 54, and have three respective compressible ramps 64, FIGS. 3 and 4, extending axially forwardly and radially inwardly from bore 54 to first abutments 46, and are radially compressed by bolt head 32 of the fastener sliding axially forwardly therepast as shown at dashed line in FIG. 8. Three of the noted second abutments 48 are also provided, and are triangulated about bore 54 in the noted interdigitated manner relative to triangulated abutments 46. Abutments 48 have respective ramps 66 leading thereto, which ramps extend axially rearwardly and radially inwardly from bore 54 to abutments 48. Ramps 66 additionally have a reinforcement rib 68, FIG. 5, extending axially longitudinally therealong for strength reinforcement of the forward end section of tower 26.

The invention further includes a method for making a fastener system for a plastic molded part such as 24 for an axial force retention system. Plastic molded part 24 is typically formed of molded plastic material including crystallizing hardeners such as nylon and the like. Plastic molded part 24 is formed by a heated molding operation, followed by cooling, during which the plastic of the part crystallizes and hardens. The present method involves the step of sliding fastener 30 axially forwardly as shown at arrow 50 through bore 54 while plastic molded part 24 is still warm from the molding operation, and before the plastic crystallizes and hardens. It has been found that if such axial sliding step of fastener 30 is not done until after cooling and hardening crystallization of the plastic, then tower 26 is subject to significantly greater risk of breaking or cracking. By sliding fastener 30 axially through the bore while the plastic is still warm from the mold, abutments 46 are still soft and compressible, and are radially compressed during the noted axial sliding step of fastener 30, including forward axial movement of bolt head 32 at arrow 50 past abutments 46, whereafter abutments 46 snap in radially behind bolt head 32 at shoulder 58 and lock the fastener in place. Molding of plastic molded part 24 including tower 26 is enabled by a plurality of first mold draw surfaces such as shown schematically at 70 on FIG. 9, extending axially through respective gaps between respective second abutments 48 and having an axially rearwardly facing mold surface 72 forming a respective first abutment 46 axially aligned therewith, and by a plurality of second mold draw surfaces such as shown schematically at 74 in FIG. 8, extending axially through respective gaps between respective first abutments 46 and having an axially forwardly facing mold surface 76 forming a respective second abutment 48 axially aligned therewith. The first mold draw surfaces such as 70 are withdrawn axially forwardly as shown at arrow 78 relative to bore 54, and the second mold draw surfaces such as 74 are withdrawn axially rearwardly as shown at arrow 80 relative to bore 54.

It is recognized that various equivalents, alternatives and modifications are possible within the scope of the appended claims.

What is claimed is:

1. A filter housing for a filter element, comprising a base having a tower extending axially along an axis away from said base, said tower having an axially extending bore therein, said bore being defined by an inner sidewall having fist and second abutments axially spaced from each other and facing axially in opposite directions, a cover mounted to said base by a fastener applying an axial compression force for holding said filter element between said cover and said base, said fastener extending axially in said bore and having a first axial end secured to said tower in snap fit relation in said bore and having a second distally opposite axial end ending beyond said bore for securing said cover to said base, said first axial end having an outer perimeter complementally shaped to said inner sidewall of said bore and received in said bore in keyed relation to prevent rotation of said fastener about said axis, said first axial end having first and second shoulders facing axially in opposite directions, said first and second shoulders being axially spaced from each other by a first axial dimension along said outer perimeter of said first axial end of said fastener, said first and second abutments being axially spaced from each other by a second axial dimension along said inner sidewall of said bore, said second axial dimension along said inner sidewall of said bore being greater than or equal to said first axial dimension along said outer perimeter of said first axial end of said fastener.

2. The invention according to claim 1 wherein each of said first and second abutments is axially spaced from said base.

3. The invention according to claim 1 wherein each of said abutments extends radially between an outer end at said inner sidewall of said bore and an inner end radially inward of said outer perimeter of said first axial end of said fastener.

4. The invention according to claim 3 wherein at least one of said abutments has a radially compressible ramp extending axially within said bore along said inner sidewall of said bore from a starting end flush with said inner sidewall to a finishing end at said inner end of the respective said abutment, said first axial end of said fastener being axially slidable along said ramp from said staring end to said finishing end, said ramp being increasingly radially outwardly compressed as said first axial end of said fastener slides axially therealong from said starting end to said finishing end, whereafter said finishing end at said inner end of the respective said abutment snaps back radially inwardly, with the respective said abutment in stopping axial engagement against the respective said shoulder.

5. The invention according to claim 4 wherein at least a portion of said ramp is axially spaced from said base.

6. The invention according to claim 5 wherein all of said ramp, including said starting end and said finishing end, is axially spaced from said base.

7. A filter housing for a filter element, comprising a base having an axially extending standing tower, a cover mounted to said base by a fastener applying an axial compression force for holding said filter element between said cover and said base, said fastener having a first axial end secured to said tower in snap fit relation, and a second distally opposite axial end releasably securing said cover to said base, said tower having a bore extending axially therein along an axis, said fastener extending axially in said bore and having said first axial end retained in said bore in snap fit relation, and said second axial end extending axially beyond said bore, said first axial end having a plurality of axially facing first shoulders, and a plurality of distally oppositely axially facing second shoulders axially spaced from said first shoulders, said first shoulders facing axially rearwardly, said second shoulders facing axially forwardly, said bore comprising a plurality of axially facing first abutments, and a plurality of distally oppositely axially facing second abutments axially spaced from said first abutments, said first abutments facing axial forwardly, said second abutments facing axially rearwardly, said first shoulders facing said first abutments, said second shoulders facing said second abutments, said first axial end of said fastener having a perimeter received in said bore in keyed relation to prevent rotation of said fastener about said axis, said first axial end of said fastener being trapped between said first and second abutments by stopping engagement of said first shoulders against said first abutments, and said second shoulders against said second abutments, said first abutments being circumferentially spaced around said bore, said second abutments being circumferentially spaced around said bore, said first abutments being interdigitated relative to said second abutments in axial end view, wherein said tower has a rearward end section at said base and a forward end section axially distally oppositely spaced from said rearward end section, and comprising a plurality of first ramps extending axially forwardly and radially inwardly from said bore to said first abutments, and a plurality of second ramps extending axially rearwardly and radially inwardly from said bore to said second abutments.

8. The invention according to claim 7 wherein said second ramps additionally have a reinforcement rib extending axially therealong for strength reinforcement of said forward end section of said tower.

\* \* \* \* \*